United States Patent [19]

Tysoe

[11] Patent Number: 4,558,402

[45] Date of Patent: Dec. 10, 1985

[54] VEHICLE LAMP ASSEMBLY

[75] Inventor: Nicholas W. Tysoe, Worcester, England

[73] Assignee: Britax Vega Limited, United Kingdom

[21] Appl. No.: 666,132

[22] Filed: Oct. 30, 1984

Related U.S. Application Data

[63] Continuation of Ser. No. 501,013, Jun. 6, 1983, abandoned.

[30] Foreign Application Priority Data

Jun. 19, 1982 [GB] United Kingdom ................. 8217822
Jan. 13, 1983 [GB] United Kingdom ................. 8300879

[51] Int. Cl.⁴ .......................... F21V 7/00; H01G 5/06

[52] U.S. Cl. .................................... 362/293; 362/328; 362/331; 362/61

[58] Field of Search ..................... 362/61, 80, 83, 257, 362/268, 293, 296-301, 307-311, 317, 326-331, 333-343, 346-351; 350/286, 451, 452

[56] References Cited

U.S. PATENT DOCUMENTS

| | | | |
|---|---|---|---|
| 1,345,073 | 6/1920 | Clark | 362/329 X |
| 1,399,749 | 12/1921 | Conklin | 362/328 |
| 1,883,360 | 10/1932 | Fortney | 362/268 |
| 1,904,574 | 4/1933 | Turner | 363/328 X |
| 1,993,147 | 3/1935 | Cathrill | 362/61 X |
| 1,995,012 | 3/1935 | Rivier | 362/346 X |
| 2,044,224 | 6/1936 | Peple | 362/61 X |
| 2,119,370 | 5/1938 | Leunen | 362/300 X |
| 2,212,975 | 8/1940 | Boynton | 362/293 X |
| 3,969,621 | 7/1976 | Ferrell | 362/299 |
| 4,053,766 | 10/1977 | Brass | 362/301 |
| 4,158,222 | 6/1979 | Cook | 362/328 X |
| 4,177,505 | 12/1979 | Carel | 362/328 X |
| 4,293,892 | 10/1981 | Plummer | 362/331 X |
| 4,390,934 | 6/1983 | Willing | 362/329 X |

FOREIGN PATENT DOCUMENTS

| | | | |
|---|---|---|---|
| 0071583 | 2/1983 | European Pat. Off. | 362/61 |
| 1663875 | 9/1953 | Fed. Rep. of Germany | 350/452 |
| 1093685 | 11/1960 | Fed. Rep. of Germany | 362/299 |
| 1259747 | 7/1963 | Fed. Rep. of Germany . | |
| 1183873 | 12/1964 | Fed. Rep. of Germany | 362/293 |
| 1186004 | 1/1965 | Fed. Rep. of Germany | 362/331 |
| 2206315 | 8/1973 | Fed. Rep. of Germany . | |
| 2385977 | 12/1978 | France | 362/331 |
| 2476798 | 8/1981 | France . | |
| 2501333 | 9/1982 | France | 362/296 |
| 2507741 | 12/1982 | France | 362/61 |
| 2509429 | 1/1983 | France | 362/61 |
| 2390673 | 10/1984 | France . | |
| 812148 | 4/1959 | United Kingdom . | |
| 1016301 | 1/1966 | United Kingdom | 362/328 |
| 1021159 | 3/1966 | United Kingdom . | |
| 2070222 | 9/1981 | United Kingdom | 362/61 |

*Primary Examiner*—Ronald H. Lazarus
*Attorney, Agent, or Firm*—Hayes, Davis & Soloway

[57] ABSTRACT

A vehicle lamp assembly, of the type in which the color of the light to be produced by the lamp cannot readily be perceived when the lamp is not illuminated, comprises a housing having an inner portion containing a light source and an outer portion enclosed by a lens arranged to collimate light from the light source. The outer portion of the housing is separated from the inner portion by a color filter. The inner surface of the side walls of the inner portion are of stepped form so as to be either substantially parallel to or substantially perpendicular to the optical axis of the assembly.

4 Claims, 6 Drawing Figures

VEHICLE LAMP ASSEMBLY

This is a continuation of application Ser. No. 501,013 filed June 6, 1983 now abandoned.

This invention relates to vehicle lamp assemblies of the type in which the colour of the light to be produced by the lamp cannot readily be perceived when the lamp is not illuminated. This reduces the risk that, in bright sunlight for example, the lamp assembly may appear to be illuminated, when in fact it is not.

According to the invention, a vehicle lamp assembly comprises a housing having an inner portion containing a light source and an outer portion enclosed by a lens arranged to collimate light from the light source, the outer portion of the housing being separated from the inner portion by a colour filter and having the inner surface of its side walls of stepped form so as to be either substantially parallel to or substantially perpendicular to the optical axis of the assembly.

The colour of the filter is chosen to be such as to give, in combination with the lens, the required colour when the lamp is illuminated. The colour of the stepped side walls is chosen in accordance with the required appearance when the lamp is off.

The lens may be of the rectangular-pencil Fresnel type although other types can be used.

When the required physical shape of the outer lens and housing is such as not to be compatible with a rotationally symmetrical collimating lens, a light transmitting cover element may be disposed outside the collimating lens and the collimating lens may comprise coaxial inner and outer surfaces located with the light source on their common axis, one of the cylindrical surfaces carrying elongated Fresnel prism formations of uniform cross-section extending parallel to the common axis and the other cylindrical surface carrying elongate Fresnel prism formations of constant cross-section extending in respective planes perpendicular to said common axis.

Preferably the prism formations on the outer surface are parallel to the common axis while those on the inner surface are perpendicular thereto.

The cover element may carry conventional pillow optics on one of its surfaces, preferably its inner surface.

In one form of the invention, the light source comprises a primary light source such as an electric filament lamp. In another form of the invention, the light source comprises a zone onto which light is focused from a remote primary source. For example, the light source of the invention may be one focus of an elipse with the primary light source located at the other focus.

Embodiments of the invention will now be described, by way of example, with reference to the accompanying drawings, in which.

Figure 1:
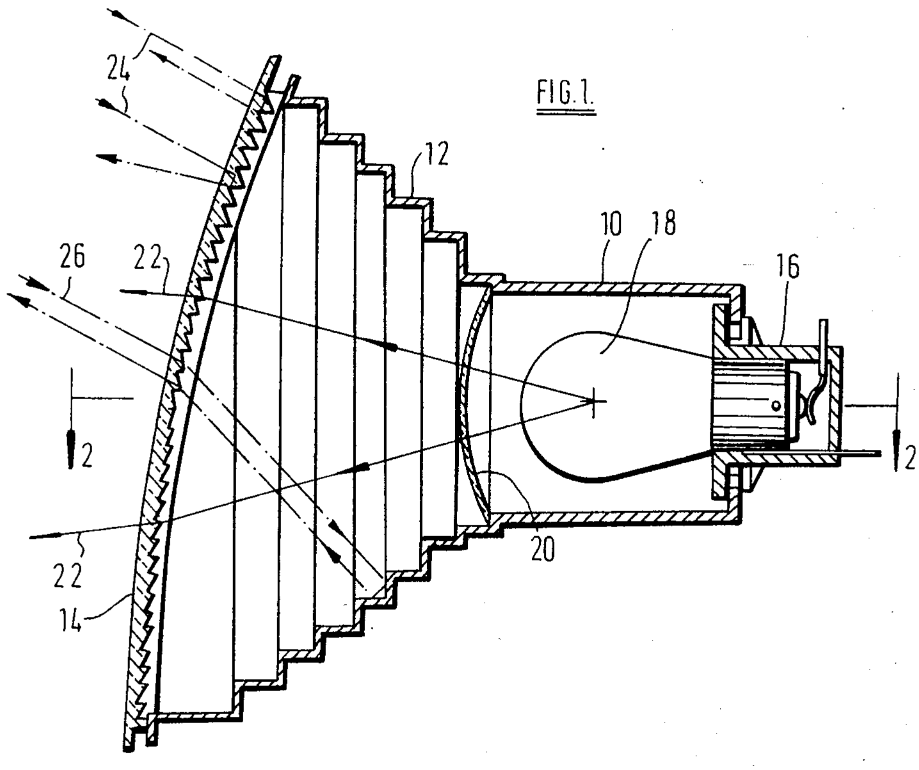
FIG. 1 is a vertical cross-sectional view of a lamp assembly in accordance with a first embodiment of the invention, taken on the line 1—1 in FIG. 1.
Figure 2:
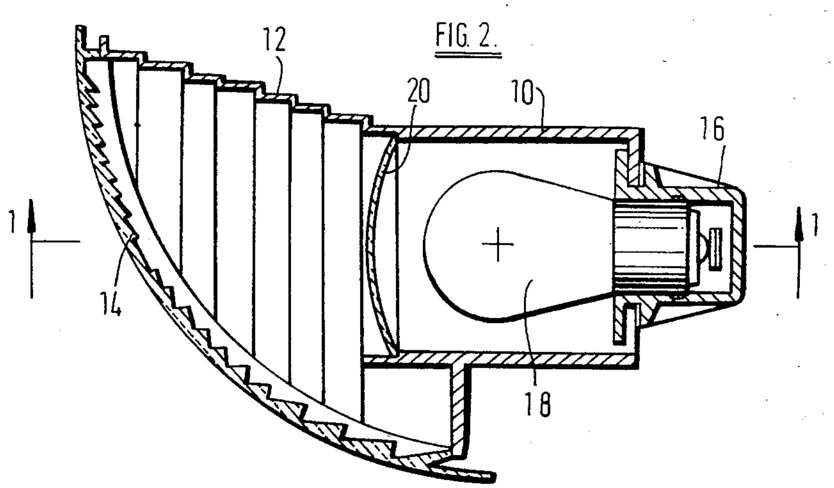
FIG. 2 is a cross-sectional view taken on the line 2—2 in FIG. 1.

Referring to FIGS. 1 and 2, a front direction indicator lamp assembly comprises a housing having an inner cylindrical portion 10 and an outer portion 12 with stepped side walls which taper from the periphery of a clear lens 14 to the junction of the inner portion 10. The surfaces of the steps of the side walls of the portion 12 are either parallel to or perpendicular to the axis of the cylindrical inner portion 10, which axis is the optical axis of the lamp. The inner portion 10 of the housing inculdes a bulb holder 16 supporting a bulb 18. The lens 14, which is of the rectangular pencil Fresnel type is arranged to collimate light from the bulb 18.

As can be seen from the drawings, the diameter of the inner portion 10 of the housing is chosen to be the minimum which will allow provision of the required cooling for the bulb 18. An amber colour filter 20, of this minimum diameter, separates the two portions 10 and 12 of the housing.

When the lamp is on, amber light is emitted from the lamp assembly, as represented by the rays 22. When the lamp is off, then some incident light, such as the rays 24, is subject to total internal reflection at the inner surface of the lens 14. Other light, such as the ray 26, which penetrate the lens 14, is incident on the stepped side walls of the outer portion 12 of the housing which is coloured white. Consequently such light is directed back though the lens 14 which therefore presents a crystal white appearance.

Figure 3:
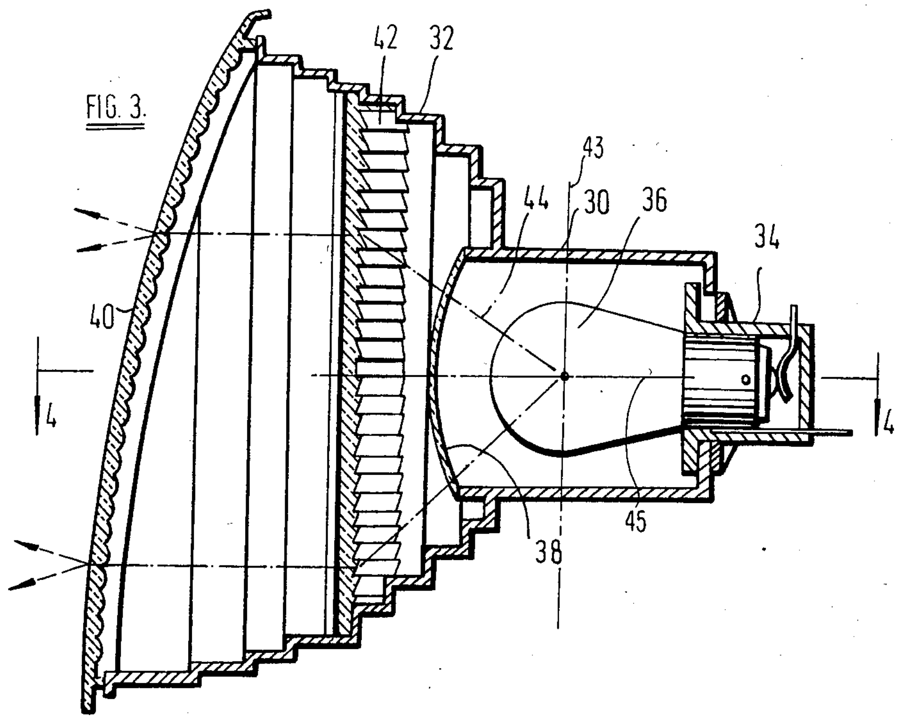
FIG. 3 is a vertical cross-sectional view of a lamp in accordance with a second embodiment of the invention, taken on the line 3—3 in FIG. 4.
Figure 4:
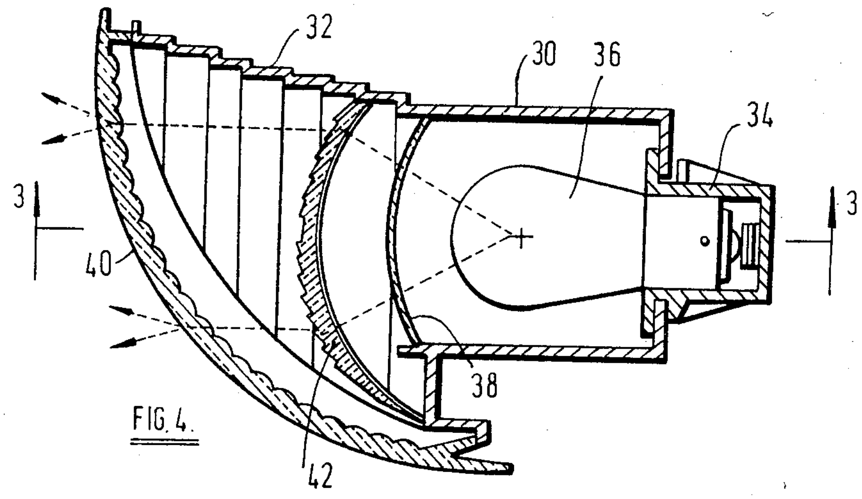
FIG. 4 is a cross-sectional view taken on the line 4—4 in FIG. 3.

Turning now to FIGS. 3 and 4, an alternative form of front direction indicator lamp comprises a housing having an inner cylindrical portion 30 and an outer portion 32 with stepped side walls. As with the embodiment illustrated in FIGS. 1 and 2, the surfaces of the steps of the side walls of the portion 32 are either parallel to or perpendicular to the axis of the cylindrical inner portion 30, which axis is the optical axis of the lamp. As before, the inner portion 30 includes a bulb holder 34 supporting a bulb 36 and an amber filter 38 separates the two portions 30 and 32 of the housing.

The front of the front portion 32 of the housing is covered by a clear lens 40 having conventional pillow optics on its inner surface. Located within the outer portion 32 of the housing, between the colour filter 38 and the outer lens 40, is a cylindrical intermediate element 42 of transparent plastics material, the axis 43 of the cylinder passing though the filament of the bulb 36. The inner surface of the intermediate element 42, i.e. the surface closer to the colour filter 38, carries elongated Fresnel prism formations extending in respective planes perpendicular to the axis 43 of the cylinder, while the outer surface carries Fresnel prism formations extending parallel to such axis.

When the bulb 36 is illuminated, rays of light therefrom, such as the ray 44 are deflected into horizontal planes parallel to the optical axis of the lamp, as can best be seen from FIG. 3, by the Fresnel prisms on the inner surface of the intermediate element 42, but they still extend radially within such planes, as can be seen in FIG. 4. They are deflected parallel to the optical axis of the lamp within such planes, i.e. in the vertical direction, by the Fresnel prisms on the outer surface, as shown in FIG. 4. Thus a parallel beam is directed onto the entire inner surface of the outer lens 40 where it is given the required amount of divergence by the pillow optics.

Figure 5:
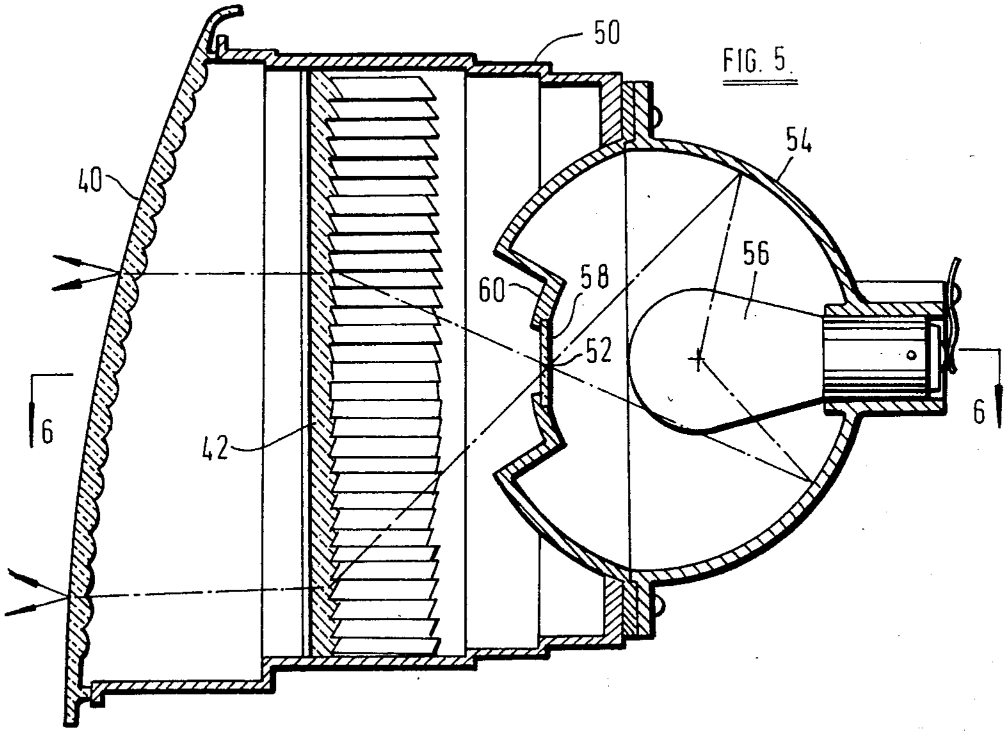
FIG. 5 is a vertical cross-sectional view of a lamp assembly in accordance with a third embodiment of the invention, taken on the line 6—6 in FIG. 5.
Figure 6:
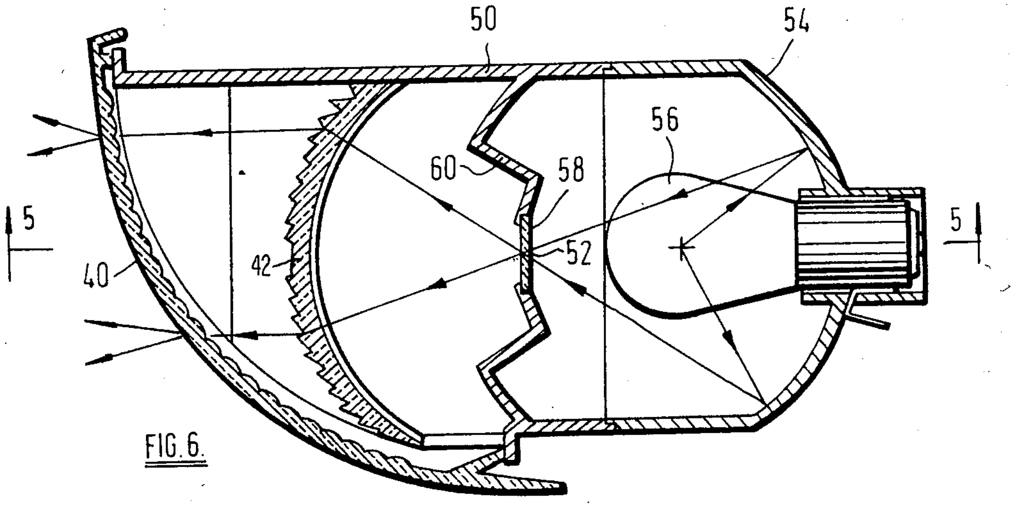
FIG. 6 is a cross-sectional view taken on the line 5—5 in FIG. 6.

The invention may also be applied to a light of the type described in Patent Specification No. GB-A-1016301. The housing 50 of the lamp illustrated in FIGS. 5 and 6 has an outer lens 40 and an intermediate element 42 which are identical with the correspondingly numbered components illustrated in FIGS. 3 and 4 and which will therefore not be described in detail.

Located on the axis of the cylindrical intermediate element 42 is one focus 52 of an ellipsoidal reflector 54 which has a filament of a bulb 56 at its other focus. A light transmitting element 58, coloured in accordance with the required colour of the lamp when illuminated, is mounted at the first mentioned focus 52 in an opaque support 60. The outer surface of the support 60 is coloured in accordance with the required colour of the lamp when not illuminated, usually white for a front direction indicator.

I claim:

1. A vehicle lamp assembly having an optical axis and comprising a housing having an inner portion containing a light source, an outer portion closed by an outer lens and including an intermediate element fixedly mounted between the light source and the lens and arranged to collimate light from the light source in a direction substantially parallel to an optical axis of the assembly, the outer portion of the housing being separated from the inner portion by a colour filter which is of smaller area than the outer lens, and the outer portion having a tapering inner surface extending from its narrowest portion adjacent the colour filter to its widest portion adjacent the outer lens, said inner surface comprising a series of alternate first zones and second zones, said second zones being substantially perpendicular to said first zones so that light from outside the lamp which is incident on said first and second zones is reflected back in a direction parallel to its direction of incidence on said zones without passing through the colour filter.

2. A lamp assembly according to claim 1, wherein the intermediate element comprises generally cylindrical inner and outer surfaces having their axes coincident with each other, perpendicular to said optical axis and located with the light source at the intersection of said optical axis and said coincident axes, one of said cylindrical surfaces carrying elongate Fresnel prism formations of uniform cross-section extending in respective planes perpendicular to said coincident axes and the other cylindrical surface carrying elongate Fresnel prism formations of constant cross-section extending in respective planes perpendicular to said coincident axes, so as to direct collimated light from the source parallel to said optical axis and on to substantially the whole of the outer lens.

3. A vehicle lamp assembly having an optical axis and comprising a housing having an inner portion containing a light source and an outer portion closed by a lens, the lens having inner and outer surfaces relative to the housing, and a collimating means fixedly positioned on said lens between the outer surface of the lens and the light source arranged to collimate light from the light source in a direction substantially parallel to an optical axis of the assembly, the outer portion of the housing being separated from the inner portion by a colour filter which is of smaller area than the lens, and the outer portion having a tapering inner surface extending from its narrowest portion adjacent the colour filter to its widest portion adjacent the lens, said inner surface comprising a series of alternate first zones and second zones, said second zones being substantially perpendicular to said first zones so that light from outside the lamp which is incident on said first and second zones is reflected back in a direction parallel to its direction of incidence on said zones without passing through the colour filter.

4. A lamp assembly according to claim 3, wherein the collimating means is a Fresnel lens formed on the inner surface of the lens.

* * * * *